United States Patent
Hund et al.

(10) Patent No.: US 8,734,616 B2
(45) Date of Patent: May 27, 2014

(54) ACRYLAMIDE-DERIVED CATIONIC COPOLYMERS, AND USES THEREOF

(75) Inventors: René Hund, Villars (FR); Christophe Auriant, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 13/388,514

(22) PCT Filed: Aug. 3, 2010

(86) PCT No.: PCT/FR2010/051644
§ 371 (c)(1),
(2), (4) Date: Feb. 2, 2012

(87) PCT Pub. No.: WO2011/015783
PCT Pub. Date: Feb. 10, 2011

(65) Prior Publication Data
US 2012/0132382 A1    May 31, 2012

(30) Foreign Application Priority Data
Aug. 4, 2009  (FR) ...................................... 09 55471

(51) Int. Cl.
*D21H 11/00*    (2006.01)
(52) U.S. Cl.
USPC .................................................... 162/164.6
(58) Field of Classification Search
USPC ........... 162/164.6, 158, 178, 168, 181.6, 185;
525/369, 421, 72, 286, 312, 329.4,
525/371; 524/505, 492; 526/307.3
See application file for complete search history.

(56) References Cited

U.S. PATENT DOCUMENTS

| | | | | |
|---|---|---|---|---|
| 3,169,358 | A | | 2/1965 | Ertsgaard et al. |
| 3,986,875 | A | * | 10/1976 | Yoshida et al. ............... 430/213 |
| 4,124,386 | A | * | 11/1978 | Yoshida et al. ............... 430/213 |
| 4,668,748 | A | * | 5/1987 | Hardam et al. ............... 526/240 |
| 5,039,757 | A | * | 8/1991 | Takaki et al. ................. 525/343 |
| 6,013,725 | A | * | 1/2000 | Dougherty ..................... 524/831 |
| 2004/0118540 | A1 | | 6/2004 | Garnier et al. |
| 2006/0102306 | A1 | * | 5/2006 | Sato ............................ 162/164.1 |
| 2006/0142431 | A1 | * | 6/2006 | Sutman et al. .................. 524/13 |

FOREIGN PATENT DOCUMENTS

| | | | |
|---|---|---|---|
| EP | 0 377 313 | A2 | 7/1990 |
| IN | 65/CHE/2009 | * | 1/2009 |
| JP | 54 145790 | A | 11/1979 |
| JP | 56 144295 | A | 11/1981 |
| JP | 61 120807 | A | 6/1986 |
| JP | 6 057685 | A | 3/1994 |
| WO | 2006/075115 | A2 | 7/2006 |
| WO | 2008/107620 | A2 | 9/2008 |
| WO | 2009/013423 | A2 | 1/2009 |
| WO | 2010/061082 | A1 | 6/2010 |

OTHER PUBLICATIONS

International Search Report for International Application No. PCT/FR2010/051644, dated Nov. 5, 2010.
Naruhiko et al., "Cationic polyacrylamides" Database Caplus (Online) Chemical Abstracts Service, Columbus, Ohio, US, Dec. 5, 1984.
"Modified Acrylamide for Papermaking" Database Caplus (Online) Chemical Abstracts Service, Columbus, Ohio, US, Dec. 5, 1984.
Database WPI Week 199413, Thomson Scientific, London, GB; AN 1994-107406.
Database WPI Week 198629, Thomson Scientific, London, GB; AN 1986-187065.

* cited by examiner

*Primary Examiner* — Mark Halpern
(74) *Attorney, Agent, or Firm* — Heslin Rothenberg Farley & Mesiti P.C.

(57) ABSTRACT

Cationic or amphoteric (co)polymer obtained by Hofmann degradation reaction, in aqueous solution, in the presence of an alkaline-earth and/or alkali metal hydroxide and of an alkaline-earth and/or alkali metal hypohalide, on a base (co)polymer comprising at least one nonionic monomer chosen from the group comprising acrylamide (and/or methacrylamide) and N,N-dimethylacrylamide, is characterized in that the base (co)polymer is modified beforehand with at least one polyfunctional compound containing at least 3 heteroatoms chosen from N, S, O and P and each having at least one mobile hydrogen. Use as a flocculation, retention and/or drainage aid, and dry strength aid is contemplated.

17 Claims, No Drawings

ACRYLAMIDE-DERIVED CATIONIC COPOLYMERS, AND USES THEREOF

CROSS REFERENCE TO RELATED APPLICATIONS

This application is a national stage filing under section 371 of International Application No. PCT/FR2010/051644, filed on Aug. 3, 2010, and published in French on Feb. 10, 2011, as WO 2011/015783 and claims priority of French application No. 0955471 filed Aug. 4, 2009, the entire disclosure of these applications being hereby incorporated herein by reference.

BACKGROUND ART

The invention relates to stable cationic or amphoteric (co) polymers obtained by Hofmann degradation carried out on a base (co)polymer comprising acrylamide or derivatives and incorporating, at its very heart, at least one polyfunctional compound containing at least 3 heteroatoms each having at least one mobile hydrogen, and also to the uses thereof as flocculation, retention and/or drainage aids, and dry strength aids in a paper-making process.

More specifically, according to the invention, the cationic or amphoteric acrylamide-based (co)polymers are organic polymers characterized in that they are obtained by Hofmann degradation on an acrylamide-based base (co)polymer incorporating, at its very heart, at least one polyfunctional compound containing at least 3 heteroatoms each having at least one mobile hydrogen, in the presence of an alkali and/or alkaline-earth metal hydroxide (advantageously sodium hydroxide), and of an alkali and/or alkaline-earth metal hypochlorite (advantageously sodium hypochlorite).

Hofmann Degradation

This reaction, discovered by Hofmann at the end of the nineteenth century, makes it possible to move from an amide to a primary amine having one fewer carbon atom. The reaction mechanism is given in detail below.

In the presence of a base (sodium hydroxide), a proton is removed from the amide.

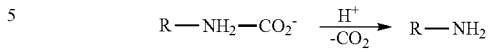

The amidate ion formed then reacts with the active chlorine ($Cl_2$) of the hypochlorite (e.g.: NaClO, which is in equilibrium: $2NaOH+Cl_2 \leftrightarrows NaClO+NaCl+H_2O$) to give an N-chloramide. The base (NaOH) removes a proton from the chloramide to form an anion. The anion loses a chloride ion to form a nitrene, which undergoes a rearrangement to an isocyanate.

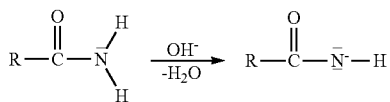

Via reaction between the hydroxide ion and the isocyanate, a carbamate is formed.

After decarboxylation (elimination of $CO_2$) starting from the carbamate, a primary amine is obtained.

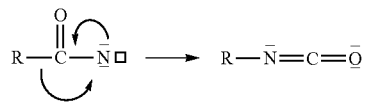

For the conversion of all or some of the amide functions of an acrylamide (co)polymer to amine functions, 2 main factors are involved (expressed as molar ratios). These are:—Alpha= (alkali and/or alkaline-earth metal hypohalide/acrylamide) and—Beta=(alkali and/or alkaline-earth metal hydroxide/alkali and/or alkaline-earth metal hypohalide).

The polymers obtained by the Hofmann degradation reaction are especially used in paper manufacturing processes. Generally, it is known that in order to be effective as strength aids, the (co)polymers used must be in the most cationic form possible and therefore must have a high degree of degradation. Indeed, as a function of the Alpha degree of degradation, it is possible to generate variations of cationicity linked to the amount of amine functions produced on the carbon-based backbone of the (co)polymer. Furthermore, it is known that when the product obtained by the Hofmann degradation reaction is amphoteric, this product can also be used to improve the retention of fillers during the paper or board manufacturing process, while maintaining the dry strength performances.

Until recently, only very expensive processes using, in situ, a unit for manufacturing a Hofmann degradation product (EP 377 313) or processes using another polymer (base of N-vinylformamide (co)polymer type followed by a hydrolysis), which is itself relatively costly (US 2004/118540), have been installed.

The first viable industrial solution was proposed at the beginning of 2005 in document WO 2006/075115 by the applicant. In this document, the Hofmann degradation product claimed is an organic polymer produced at a concentration of greater than 3.5% by weight and preferably greater than 4.5%. Even though the dry strength performances are greatly improved, the polymers produced have a very low molecular weight giving the (co)polymer a very limited advantage for applications such as drainage or flocculation.

Documents WO 2008/107620 and WO/2010/061082 A1 by the applicant have made it possible to partly solve this problem of low drainage performances. However, a person skilled in the art who is in need of increased drainage and retention has had to face a certain limitation of the performances of his products.

In document JP 61120807, a polyacrylamide is prepared by Hofmann degradation reaction on a polymer, in the presence of guanidinium. The guanidinium reacts with an intermediate compound of the Hofmann degradation, an isocyanate. The polymer obtained in this document is therefore a polymer modified during the Hofmann degradation, with modification of an intermediate compound.

Document WO2009/013423 A2 by the applicant describes a (co)polymer derived from acrylamide obtained by Hofmann degradation on a base (co)polymer. The (co)polymer is then branched. This document also discloses the possibility of adding certain additives (polyamines, polyethyleneimines, etc.) to the solution of base (co)polymer, before or during the Hofmann degradation reaction. It is the addition of additives capable of reacting with the isocyanate functions of the polymer that are generated during the degradation of the base (co)polymer.

The problem addressed by the invention is therefore to develop a wide range of polymers, the drainage and retention properties of which can be further improved relative to the preceding invention.

Due to their intrinsic properties (stabilization, cationization, complexation, etc.) the polymers of the invention may also be advantageous in very diverse applications, mention will be made, nonlimitingly, of water treatment (drinking water or wastewater), coagulation/flocculation techniques, the mining industry, the cosmetics and detergent industry, the textile industry, etc.

DESCRIPTION OF THE INVENTION

The applicant has developed stable cationic or amphoteric (co)polymers, obtained by Hofmann degradation of a base (co)polymer based on acrylamide or derivatives incorporating, at its very heart, at least one polyfunctional compound containing at least 3 heteroatoms, each having at least one mobile hydrogen.

The heteroatoms may be: N, S, O and P.

The polyfunctional compounds may be: oligomers, polymers and carbon-based chains comprising at least three carbon atoms.

In this family of additional polyfunctional compounds, mention will be made of polyethyleneimines (PEIs), polyamines (primary and secondary), polyallylamines, polythiols, polyalcohols, polyamide-epichlorohydrin (PAE) resins, polyamine amides (PAAs), etc.

The applicant observed, surprisingly and unexpectedly, that the incorporation of at least one additional polyfunctional compound before or during the polymerization of the Hofmann base (co)polymer makes it possible to give the final cationic or amphoteric polymer an improvement in the drainage performances relative to the Hofmann polymers of the prior art and relative to existing products based on hydrolyzed polyvinyl formamide.

The expression "Hofmann polymer or (co)polymer" is understood to mean any polymer or (co)polymer obtained after the Hofmann degradation reaction on a base polymer or on a base (co)polymer.

The term "incorporation" is understood to mean any process that aims to bond to the polymer chain a polyfunctional compound (via a mobile proton) that is capable of being subsequently bonded to another polymer chain via another mobile proton. Without wishing to put forward any theory, this would be a structuring of the polymer base (branching, star-branching, network formation, etc.).

The term "DSR" denotes the dry strength Resistance.

In other words, one subject of the invention is a cationic or amphoteric (co)polymer obtained by Hofmann degradation reaction, in aqueous solution, in the presence of an alkaline-earth and/or alkali metal hydroxide and of an alkaline-earth and/or alkali metal hypohalide, on a base (co)polymer comprising at least one nonionic monomer chosen from the group comprising acrylamide (and/or methacrylamide), N,N-dimethylacrylamide, characterized in that the base (co)polymer is modified beforehand with at least one additional polyfunctional compound. Said additional polyfunctional compound is advantageously chosen from the group comprising polyethyleneimine, polyamine (primary or secondary), polyallylamine, polythiols, polyalcohols, polyamide-epichlorohydrin (PAE) resins, polyamine amides (PAAs), etc.

The additional polyfunctional compound contains at least 3 heteroatoms chosen from N, S, O and P and each having at least one mobile hydrogen.

The invention relates in particular to the products of Hofmann degradation on a base (co)polymer comprising:
at least one nonionic monomer chosen from the group comprising acrylamide (and/or methacrylamide) and N,N-dimethylacrylamide,
the modification of the base (co)polymer with at least one additional polyfunctional compound, said modification consisting either in incorporating the additional polyfunctional compound(s) before or during the polymerization of the constituent comonomers of the base (co)polymer, or in grafting the additional polyfunctional compound(s) to the base (co)polymer.

In particular owing to the modification of the base (co)polymer prior to the Hofmann degradation, the present invention thus makes it possible to attain, surprisingly, a performance level that was hitherto unequaled by (co)polymers resulting from the Hofmann degradation, in particular in the paper-making application and especially in terms of drainage, dewatering and/or retention.

In practice, the modification is carried out (1) by incorporation of at least one polyfunctional compound before or during the polymerization reaction, or (2) by grafting of at least one polyfunctional compound to the base (co)polymer. The Hofmann degradation is then carried out on this previously modified base (co)polymer.

In one preferred embodiment, the polyfunctional compound incorporated is polyethyleneimine (PEI). Just as advantageously, the polyfunctional compound incorporated is polyamine amide (PAA).

In practice, the (co)polymer obtained at the end of the Hofmann reaction could be branched after having optionally branched the base (co)polymer. In other words, it is the branched nature of the base (co)polymer which will impart its branched state to the final (co)polymer.

In one preferred embodiment, the (co)polymer is obtained by Hofmann degradation reaction in the presence, as hypohalide, of an alkali metal hypochlorite, advantageously sodium hypochlorite.

According to another feature, the hypohalide/nonionic monomer Alpha coefficient used for the preparation of the polymers of the invention is greater than 0.1, or greater than 0.3, advantageously greater than 0.5 and preferably less than 1.

The (co)polymer obtained according to the invention may successfully be used for the manufacture of papers and packaging boards, coated papers, any type of paper, board or the like requiring the use of a cationic polymer as a coagulation aid and/or retention aid and/or cationic charge promoter.

The cationic or amphoteric acrylamide (co)polymers of the invention allow, in particular, a significant gain in productivity of the paper machines on which these polymers may be used. Furthermore, they make it possible to obtain good drainage properties and very high bursting strength and tensile strength, without a negative secondary effect.

According to another feature, the Hofmann degradation product is produced at a concentration of greater than 4% by weight, preferably greater than 7%, advantageously greater than 8% by weight and advantageously has a viscosity of greater than 30 cps (at a concentration of 9%, at 25° C., Brookfield LV1, 60 rpm), preferably greater than 40 cps.

These concentrations relate to the concentration of the Hofmann degradation product. Generally, they are distinguished from the concentrations of the base (co)polymer before the Hofmann degradation reaction and from the usage concentration of the (co)polymer obtained after the Hofmann degradation.

Similarly, the (co)polymer of the invention has a cationic charge density preferably greater than 2 meq/g and advantageously greater than 5 meq/g.

Cationic or Amphoteric (Co)Polymer Derived from Acrylamide

It is obtained by a Hofmann degradation reaction on a base (co)polymer.

The "Base" (Co)Polymer

In practice, the base (co)polymer used contains:
- at least 5 mol % of a nonionic monomer chosen from the group comprising acrylamide (and/or methacrylamide) and N,N-dimethylacrylamide, preferably acrylamide,
- at least 1000 ppm of at least one additional polyfunctional compound chosen from the group comprising polyethyleneimine, polyamine (primary or secondary), polyallylamine, polythiols, polyalcohols, polyamide-epichlorohydrin (PAE) resins and polyamine amides (PAAs), advantageously polyethyleneimine,
- optionally at least:
    - one unsaturated cationic ethylenic monomer, preferably chosen from the group comprising monomers of dialkylaminoalkyl(meth)acrylamide, diallylamine and methyldiallylamine type and the quaternary ammonium or acid salts thereof. Mention will be made, in particular, of dimethyldiallylammonium chloride (DADMAC), acrylamidopropyltrimethylammonium chloride (APTAC) and/or methacrylamidopropyltrimethylammonium chloride (MAPTAC),
    - and/or one nonionic monomer preferably chosen from the group comprising N-vinyl acetamide, N-vinyl formamide, N-vinylpyrrolidone and/or vinyl acetate,
    - and/or one anionic monomer of acid or anhydride type chosen from the group comprising (meth)acrylic acid, acrylamidomethylpropyl-sulfonic acid, itaconic acid, maleic anhydride, maleic acid, methallylsulfonic acid, vinylsulfonic acid and salts thereof.

Advantageously, the base (co)polymer is branched and preferably consists of:
- acrylamide,
- polyethyleneimine,
- and at least one unsaturated cationic ethylenic comonomer, chosen from the group comprising monomers of dialkylaminoalkyl(meth)acrylamide, diallylamine and methyldiallylamine type and the quaternary ammonium or acid salts thereof, preferably dimethyldiallylammonium chloride.

It is important to note that, in combination with these monomers, it is also possible to use water-insoluble monomers such as acrylic, allyl or vinyl monomers comprising a hydrophobic group. During their use, these monomers will be employed in very small amounts, of less than 10 mol %, preferably less than 5 mol %, or even less than 1%, and they will preferably be chosen from the group comprising acrylamide derivatives, such as N-alkylacrylamide, for example N-tert-butylacrylamide, octylacrylamide and also N,N-dialkylacrylamides such as N,N-dihexylacrylamide, etc. and derivatives of acrylic acid such as alkyl acrylates and methacrylates, etc.

According to one preferred feature of the invention, the base (co)polymer may be branched.

The branching may be carried out preferably during (or optionally after) the polymerization of the "base" (co)polymer, in the presence of a polyfunctional branching agent and optionally a transfer agent. A nonlimiting list of branching agents is found below: methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of glycidyl ether type such as ethylene glycol diglycidyl ether, or epoxies or any other means well known to a person skilled in the art that permit crosslinking.

In practice, the branching agent is advantageously introduced in a proportion of five to fifty thousand (5 to 50 000) parts per million by weight relative to the active material, preferably 5 to 10 000, advantageously 5 to 5000 parts per million by weight. Advantageously, the branching agent is methylenebisacrylamide (MBA).

The incorporation of the additional polyfunctional compound within the base (co)polymer may be carried out in the reaction medium before or during polymerization, or by any other method of grafting to the base (co)polymer.

Preferably, the additional polyfunctional compound will be mixed with a comonomer before polymerization.

A nonlimiting list of transfer agents is found below: isopropyl alcohol, sodium hypophosphite, mercaptoethanol, etc.

A person skilled in the art will know how to choose the best combination as a function of their own knowledge, of the present description, and also of the examples that will follow.

The (co)polymer used as a base for the Hofmann degradation reaction does not require the development of a particular polymerization process. The principal polymerization techniques, well known to a person skilled in the art, and which may be used are: precipitation polymerization, emulsion (aqueous or inverse) polymerization, which may or may not be followed by a distillation and/or spray-drying step, and suspension polymerization or solution polymerization, these two techniques being preferred.

It is also possible to add to the base (co)polymer solution, before or during the Hofmann degradation reaction, certain additives which are capable of reacting with the isocyanate functions of the polymer generated during the degradation. Generally, these are molecules bearing nucleophilic chemical functions such as hydroxyl functions, amine functions, etc. As examples, the additives in question may therefore be of the family of: alcohols, polyols (e.g.: starch), polyamines, polyethyleneimines, etc.

The incorporation of salts of polyvalent cationic ions, as mentioned in patent application WO 2010/061082 A1 by the applicant, may also be carried out for the purpose of increasing the stability of products having an Alpha coefficient of less than 1.

Hofmann Degradation Reaction on the "Base" Copolymer

The Hofmann reaction requires the conversion of amide functions to amine functions, involving 2 main factors (expressed as molar ratios):

Alpha=(alkali and/or alkaline-earth metal hypochlorite/(meth)acrylamide); and

Beta=(alkali and/or alkaline-earth metal hydroxide/alkali and/or alkaline-earth metal hypochlorite).

Starting from a "base" (co)polymer solution described previously having a concentration between 5% and 40% by weight, preferably between 10% and 25%, the molar quantity of total (meth)acrylamide functions is determined. The level of Alpha degradation desired (which corresponds to the desired degree of amine functions) is then chosen, which makes it possible to determine the dry quantity of alkali and/or alkaline-earth metal hypohalide and then the beta coefficient is chosen, which makes it possible to determine the dry quantity of alkali and/or alkaline-earth metal hydroxide.

A solution of alkali and/or alkaline-earth metal hypohalide and alkali and/or alkaline-earth metal hydroxide is then prepared from the alpha and beta ratios. According to the invention, the reactants preferably used are sodium hypochlorite (bleach) and caustic soda (sodium hydroxide).

In order to stabilize the amine functions that will be produced, it is optionally possible to add, to the reactor containing the base (co)polymer, one (or optionally several) quaternary ammonium derivative(s) as is described in document JP 57077398 and is well known to a person skilled in the art, the purpose of which is specifically to prevent the reaction between the amine functions and the residual amide functions. Furthermore, it will be noted that the addition of these agents may be carried out separately, simultaneously, as a mixture or not, in any order of introduction and at one or more injection points.

The increase in cationicity of the base (co)polymer takes place during the Hofmann degradation, via the use, in its entirety or in part, of an alkali or alkaline-earth metal hypohalide.

Furthermore, it is also possible to propose cationic or amphoteric acrylamide (co)polymers of the invention obtained by Hofmann degradation reaction in the form of a mixture with one or more other synthetic or natural polymer(s).

Similarly, although prepared in solution, the polymers of the invention may also be proposed in solid form. Under these conditions, the solid form contains not only the (co)polymer, but also a proportion of salt obtained at the end of the Hofmann degradation reaction. In practice, they are obtained, inter alia, by processes that consist in drying the aforementioned solution. The main separation techniques then used are those of spray drying or spraying (which consists in creating a cloud of fine droplets in a hot gas stream for a controlled duration), drum drying, fluid bed dryers, etc.

The present invention also relates to the use of the (co) polymer according to the invention as flocculation, retention and/or drainage aid, and dry strength aid in a paper manufacturing process.

The invention and the advantages that result therefrom emerge clearly from the following exemplary embodiments.

EXAMPLES

Cationic Acrylamide-Derived (Co)Polymers

Polymer A:
Cationic polymer A is obtained by a Hofmann degradation reaction in accordance with example 1 of patent application WO 2010/061082 A1 by the applicant, on a base (co)polymer (20% of active material) of acrylamide (70 mol %) and of dimethyldiallylammonium chloride (DADMAC) (30 mol %) that is branched (MBA: 600 ppm/active material).

In order to produce this base, the DADMAC monomer and also the MBA are placed in the reactor. The acrylamide will be incorporated by dripping continuously, over 2 h, into a reaction medium maintained at 85° C. The catalysis will take place with SPS (sodium persulfate) and MBS (sodium metabisulfite), catalysts that are well known to a person skilled in the art.

Once the Hofmann degradation has been carried out, the final product has a viscosity of 51 cps (25° C., Brookfield LV1, 60 rpm) for a concentration of 8.5%.
This polymer represents the prior art.

Polymer B:
Cationic polymer B is obtained by a Hofmann degradation reaction on a base (co)polymer (20% of active material) of acrylamide (70 mol %) and of dimethyldiallylammonium chloride (DADMAC) (30 mol %) that is branched (MBA: 600 ppm/active material) and modified with pentaerythritol, in a proportion of 1000 ppm relative to the active material.

In order to achieve this, the pentaerythritol is mixed with the DADMAC monomer and with the MBA in the reactor.

The acrylamide will be incorporated by dripping continuously, over 2 h, into a reaction medium maintained at 85° C. The catalysis will take place with SPS and MBS, catalysts that are well known to a person skilled in the art.

The Hofmann degradation itself takes place in the same way as in example 1 of patent application WO 2010/061082 A1 by the applicant. The cationic acrylamide-derived (co) polymer thus produced has a bulk viscosity of 48 cps (25° C., Brookfield LV1, 60 rpm) and a concentration of 9.21%.

Polymer C:
Cationic polymer C is obtained by a Hofmann degradation reaction on a base (co)polymer (20% of active material) of acrylamide (70 mol %) and of dimethyldiallylammonium chloride (DADMAC) (30 mol %) that is branched (MBA: 600 ppm/active material) and modified with a secondary polyamine polymer (of FL3930 type from SNF), in a proportion of 4% by weight relative to the active material.

In order to achieve this, the polyamine is mixed with the DADMAC monomer and with the MBA in the reactor.

The acrylamide will be incorporated by dripping continuously, over 2 h, into a reaction medium maintained at 85° C. The catalysis will take place with SPS and MBS, catalysts that are well known to a person skilled in the art.

The Hofmann degradation itself takes place in the same way as in example 1 of patent application WO 2010/061082 A1 by the applicant. The cationic acrylamide-derived (co) polymer thus produced has a bulk viscosity of 50 cps (25° C., Brookfield LV1, 60 rpm) and a concentration of 8.3%.

Polymer D:
Cationic polymer D is obtained by a Hofmann degradation reaction on a base (co)polymer (20% of active material) of acrylamide (70 mol %) and of dimethyldiallylammonium chloride (DADMAC) (30 mol %) that is branched (MBA: 600 ppm/active material) and modified with a polyamine amide polymer (of Retaminol CO1 type from Kemira), in a proportion of 2.5% by weight relative to the active material.

In order to achieve this, the PAA is mixed with the DADMAC monomer and with the MBA in the reactor.

The acrylamide will be incorporated by dripping continuously, over 2 h, into a reaction medium maintained at 85° C. The catalysis will take place with SPS and MBS, catalysts that are well known to a person skilled in the art.

The Hofmann degradation itself takes place in the same way as in example 1 of patent application WO 2010/061082 A1 by the applicant. The cationic acrylamide-derived (co) polymer thus produced has a bulk viscosity of 64 cps (25° C., Brookfield LV1, 60 rpm) and a concentration of 8.34%.

Polymer E:
Cationic polymer E is obtained by a Hofmann degradation reaction on a base (co)polymer (20% of active material) of acrylamide (70 mol %) and of dimethyldiallylammonium chloride (DADMAC) (30 mol %) that is branched (MBA: 600 ppm/active material) and modified with a polyethyleneimine polymer (of Polymin HM type from BASF), in a proportion of 5% by weight relative to the active material.

In order to achieve this, the polyethyleneimine is mixed with the DADMAC monomer and with the MBA in the reactor.

The acrylamide will be incorporated by dripping continuously, over 2 h, into a reaction medium maintained at 85° C. The catalysis will take place with SPS and MBS, catalysts that are well known to a person skilled in the art.

The Hofmann degradation itself takes place in the same way as in example 1 of patent application WO 2010/061082 A1 by the applicant. The cationic acrylamide-derived (co) polymer thus produced has a bulk viscosity of 72 cps (25° C., Brookfield LV1, 60 rpm) and a concentration of 8.5%.

Polymer F:
Cationic polymer F is obtained by a Hofmann degradation reaction on a base (co)polymer (20% of active material) of acrylamide (70 mol %) and of dimethyldiallylammonium chloride (DADMAC) (30 mol %) that is branched (MBA: 600 ppm/active material) and modified with a polyethyleneimine polymer (of Polymin HM type from BASF), in a proportion of 0.8% by weight relative to the active material.

In order to achieve this, the polyethyleneimine is mixed with the DADMAC monomer and with the MBA in the reactor.

The acrylamide will be incorporated by dripping continuously, over 2 h, into a reaction medium maintained at 85° C. The catalysis will take place with SPS and MBS, catalysts that are well known to a person skilled in the art.

The Hofmann degradation itself takes place in the same way as in example 1 of patent application WO 2010/061082 A1 by the applicant. The cationic acrylamide-derived (co)polymer thus produced has a bulk viscosity of 65 cps (25° C., Brookfield LV1, 60 rpm) and a concentration of 8.4%.

RSL HF70D:

The product RSL HF70D, an SNF reference, is obtained by an alpha=1 Hofmann degradation reaction on a base (co)polymer (25% of active material) of acrylamide (70 mol %) and of dimethyldiallylammonium chloride (DADMAC) (30 mol %). The cationic acrylamide-derived (co)polymer thus produced has a bulk viscosity of 20 cps (25° C., Brookfield LV1, 60 rpm) and a concentration of 9%.

Mixture 1:

Mixture 1 is obtained by mixing polymer A described above with Polymin HM in a ratio such that the Polymin HM represents 5% by weight of the total active material. This mixture has a viscosity of 62 cps (25° C., Brookfield LV1, 60 rpm) for a concentration of 8.6%.

Mixture 2:

Mixture 2 is obtained by mixing RSL HF70D with Polymin HM in a ratio such that the Polymin HM represents 5% by weight of the total active material. This mixture has a viscosity of 29 cps (25° C., Brookfield LV1, 60 rpm) for a concentration of 9.2%.

The competitive product taken as a reference is Luredur PR 8097 from BASF, a poly(N-vinyl formamide), 50% hydrolyzed to vinylamine, of high molecular weight.

Test of Polymer Properties

A/ Drainage Performances

CSF sequence at 1000 rpm (revolutions per minute), CSF being a measure of the degree of drainability of the pulp (standard TAPPI T 2270 M-94):

Use of a static handsheet former for stirring the pulp. Introduction of 1 liter of 0.3% recycled paperboard pulp.
T=0 s: stirring of the pulp.
T=10 s: addition of polymer.
T=30 s: cessation of stirring and recovery of the liter of pulp.
Implementation of the TAPPI T 2270M-94 test.

The polymers will be injected at typical dosages for a paper machine: 800 g/tonne, 1 kg/tonne and 1.2 kg/tonne.

a) Performances Relative to the Hofmann Prior Art at Standard Dosages:

| Polymer | Cationic dosage (kg/tonne) | % improvement in CSF |
|---|---|---|
| Blank | 0 | 0 |
| Polymer A | 0.8 | 14 |
| Polymer B | 0.8 | 18 |
| Polymer C | 0.8 | 18 |
| Polymer D | 0.8 | 19 |
| Polymer E | 0.8 | 20 |
| Polymer F | 0.8 | 19 |
| RSL HF70D | 0.8 | 5 |
| Mixture 1 | 0.8 | 14 |
| Mixture 2 | 0.8 | 6 |
| Luredur PR 8097 | 0.8 | 12 |
| Blank | 0 | 0 |
| Polymer A | 1 | 27 |
| Polymer B | 1 | 30 |
| Polymer C | 1 | 32 |
| Polymer D | 1 | 32 |
| Polymer E | 1 | 34 |
| Polymer F | 1 | 34 |
| RSL HF70D | 1 | 7 |
| Mixture 1 | 1 | 28 |
| Mixture 2 | 1 | 8 |
| Luredur PR 8097 | 1 | 24 |
| Blank | 0 | 0 |
| Polymer A | 1.2 | 40 |
| Polymer B | 1.2 | 42 |
| Polymer C | 1.2 | 43 |
| Polymer D | 1.2 | 42 |
| Polymer E | 1.2 | 45 |
| Polymer F | 1.2 | 44 |
| RSL HF70D | 1.2 | 12 |
| Mixture 1 | 1.2 | 41 |
| Mixture 2 | 1.2 | 13 |
| Luredur PR 8097 | 1.2 | 40 |

For each of these analyses the highest values correspond to the best performances.

It can clearly be seen that at dosages normally applied in paper mills (between 800 g and 1.2 kg/tonne), the polymers B, C, D, E and F have better results than the polymers from the prior art. They also make it possible to maintain advantageous or even improved performances compared to a market reference product, Luredur PR 8097, at lower treatment costs, taking into account the lower raw material cost.

Furthermore, a synergy of the PEI can be observed in these examples, when this PEI is included in the backbone of the base (co)polymer, compared to the PEI mixed at the end with a product resulting from the Hofmann degradation, which does not result in any improvement.

b) Performances at Higher Dosages:

| Polymer | Cationic dosage (kg/tonne) | % improvement in CSF |
|---|---|---|
| Blank | 0 | 0 |
| Polymer A | 1.5 | 59 |
| Polymer E | 1.5 | 63 |
| Polymer A | 2 | 60 |
| Polymer E | 2 | 74 |

It can be observed that, compared to the prior art, the polymer E does not have the same saturation point at 1.5 kg/tonne, which gives a person skilled in the art a larger accessible drainage spectrum.

B/ Performances in DSR (Dry Strength) Application, Basis Weight at 60 g/m$^2$

The test: the paper handsheets are produced with an automatic dynamic handsheet former. Firstly, the paper pulp is prepared by disintegrating, over 30 minutes, 90 grams of virgin kraft fibers in 2 liters of hot water. The pulp obtained is then diluted to a total volume of 9 liters. Once the consistency has been accurately measured, the required amount of this pulp is withdrawn so as to obtain, in the end, a sheet with a basis weight of 60 g/m$^2$.

The pulp is then introduced into the chest of the dynamic handsheet former, diluted to a consistency of 0.32% and gently stirred with a mechanical stirrer in order to homogenize the fibrous suspension.

In manual mode, the pulp is pumped up to the level of the nozzle in order to prime the circuit.

A blotting paper and the forming fabric are placed in the drum of the dynamic handsheet former before starting the rotation of the drum at 900 m/min and constructing the water wall. The various dry strength aids are then introduced into the stirred fibrous suspension with a contact time of 30 seconds for each polymer. The sheet is then produced (in automatic mode) by 22 to and-fro movements of the nozzle spraying the pulp into the water wall. Once the water is drained and once the automatic sequence is completed, the forming fabric with the network of fibers formed is removed from the drum of the dynamic handsheet former and placed on a table. A dry blotting paper is deposited on the side of the mat of wet fibers and is pressed once with a roller. The assembly is turned over and the fabric is carefully separated from the fibrous mat. A second dry blotting paper is deposited and the sheet (between the two blotting papers) is pressed once under a press delivering 4 bar and is then dried on a restrained dryer for 9 min at 107° C. The two blotting papers are subsequently removed and the sheet is stored overnight in a chamber with controlled humidity and controlled temperature (50% relative humidity and 23° C.). The dry and wet strength properties of all of the sheets obtained via this procedure are then evaluated.

The burst index is measured with a Messmer Buchel M 405 bursting strength tester (average over 14 measurements).

The dry tensile strength is measured in the machine direction with a Testometric AX tensile testing machine (average over 5 samples).

In all the examples that follow, and unless otherwise indicated, the paper sheets are produced according to the above procedure while introducing firstly the cationic dry strength aid (the Hofmann degradation product) at a dosage of 1.5 kg/T (dry polymer/dry fiber), then the anionic resin at a dosage of 1.5 kg/T (dry polymer/dry fiber).

The tests are carried out with a pulp having a neutral pH.

The anionic resin (A−)

The anionic resin used during the tests is an acrylamide/sodium acrylate (co)polymer (70/30 in mol %) obtained by polymerization in solution at 15% and having a bulk viscosity of 2500 cps.

|  | Alum dosage (kg/tonne) | Cationic dosage (kg/tonne) | Anionic dosage (kg/tonne) | % increase in dry tensile strength | % increase in burst index | First pass retention in % |
|---|---|---|---|---|---|---|
| Blank | 0 | 0 | 0 | 0 | 0 | 78.7 |
| Polymer A | 2.5 | 1.5 | 1.5 | 32.7 | 48.7 | 82.3 |
| Polymer E | 2.5 | 1.5 | 1.5 | 32.2 | 47.9 | 83 |
| Luredur PR 8097 | 2.5 | 1.5 | 1.5 | 32.6 | 48.1 | 81.9 |

The term "alum" is understood to mean the compound $Al_2(SO_4)_3$ which is commonly used as a coagulant in the manufacture of paper.

Observations regarding the results: Polymer E has an improved drainage compared to polymer A while retaining good dry strength performances.

It also has DSR performances similar to Luredur PR 8097.

Moreover, it is observed that polymer E contributes to an improvement in the retention.

What is claimed is:

1. A cationic or amphoteric (co)polymer obtained by Hofmann degradation reaction, in aqueous solution, in the presence of an alkaline-earth or alkali metal hydroxide or combination thereof and of an alkaline-earth or alkali metal hypohalide or combination thereof, on a base (co)polymer comprising at least one nonionic monomer chosen from the group consisting of acrylamide, methacrylamide and N,N-dimethylacrylamide, wherein said base (co)polymer is modified beforehand with at least one polyfunctional compound containing at least 3 heteroatoms chosen from N, S, O and P and each having at least one mobile hydrogen.

2. The (co)polymer as claimed in claim 1, wherein said polyfunctional compound is chosen from the group consisting of polyethyleneimines, polyamines (primary or secondary), polyallylamines, polythiols, polyalcohols, polyamide-epichlorohydrin resins and polyamine amides.

3. The (co)polymer as claimed in claim 1, wherein said polyfunctional compound is polyethyleneimine.

4. The (co)polymer as claimed in claim 1, wherein said polyfunctional compound is polyamine amide.

5. The (co)polymer as claimed in claim 1, wherein said base (co)polymer is modified by incorporation of the polyfunctional compound before or during the polymerization of the monomers.

6. The (co)polymer as claimed in claim 1, wherein said base (co)polymer contains at least 5 mol % of nonionic monomer and at least 1000 ppm of polyfunctional compound.

7. The (co)polymer as claimed in claim 1, wherein said base (co)polymer additionally contains at least:
one unsaturated cationic ethylenic monomer, chosen from the group consisting of monomers of dialkylaminoalkyl, acrylamide, methacrylamide, diallylamine and methyldiallylamine type and the quaternary ammonium or acid salts thereof,
or one nonionic monomer,
or one anionic monomer of acid or anhydride type chosen from the group consisting of acrylic acid, methacrylic acid acrylamidomethylpropyl-sulfonic acid, itaconic acid, maleic anhydride, maleic acid, methallylsulfonic acid, vinylsulfonic acid and salts thereof,
or mixtures thereof.

8. The (co)polymer as claimed in claim 7, wherein said unsaturated cationic ethylenic monomer is chosen from the group consisting of dimethyldiallylammonium chloride (DADMAC), acrylamidopropyltrimethylammonium chloride (APTAC) and methacrylamidopropyltrimethylammonium chloride (MAPTAC).

9. The (co)polymer as claimed in claim 7, wherein said nonionic monomer is chosen from the group consisting of N-vinyl acetamide, N-vinyl formamide, N-vinylpyrrolidone and vinyl acetate.

10. The (co)polymer as claimed in claim 1, wherein said base (co)polymer consists of:
acrylamide,
polyethyleneimine,
and at least one unsaturated cationic ethylenic comonomer, chosen from the group consisting of monomers of, dialkylaminoalkylacrylamide, dialkylaminoalkylmethacrylamide, diallylamine and methyldiallylamine type and the quaternary ammonium or acid salts thereof.

11. The (co)polymer as claimed in claim 10, wherein said unsaturated cationic ethylenic monomer is dimethyldiallylammonium chloride.

12. The (co)polymer as claimed in claim 1, wherein said base (co)polymer is branched.

13. The (co)polymer as claimed in claim 1, wherein said Hofmann degradation product is produced at a concentration of greater than 4% by weight.

14. The (co)polymer as claimed in claim 1, wherein said base (co)polymer is modified by grafting of the polyfunctional compound after the final base (co)polymer has been obtained.

15. The (co)polymer as claimed in claim 1, wherein said Hofmann degradation product is produced at a concentration of greater than 7% by weight.

16. The (co)polymer as claimed in claim 1, wherein said Hofmann degradation product is produced at a concentration of greater than 8% by weight.

17. A method of making paper, comprising: employing a (co)polymer according to claim 1 as a flocculation, retention drainage or dry strength aid.

* * * * *